Figure 1:
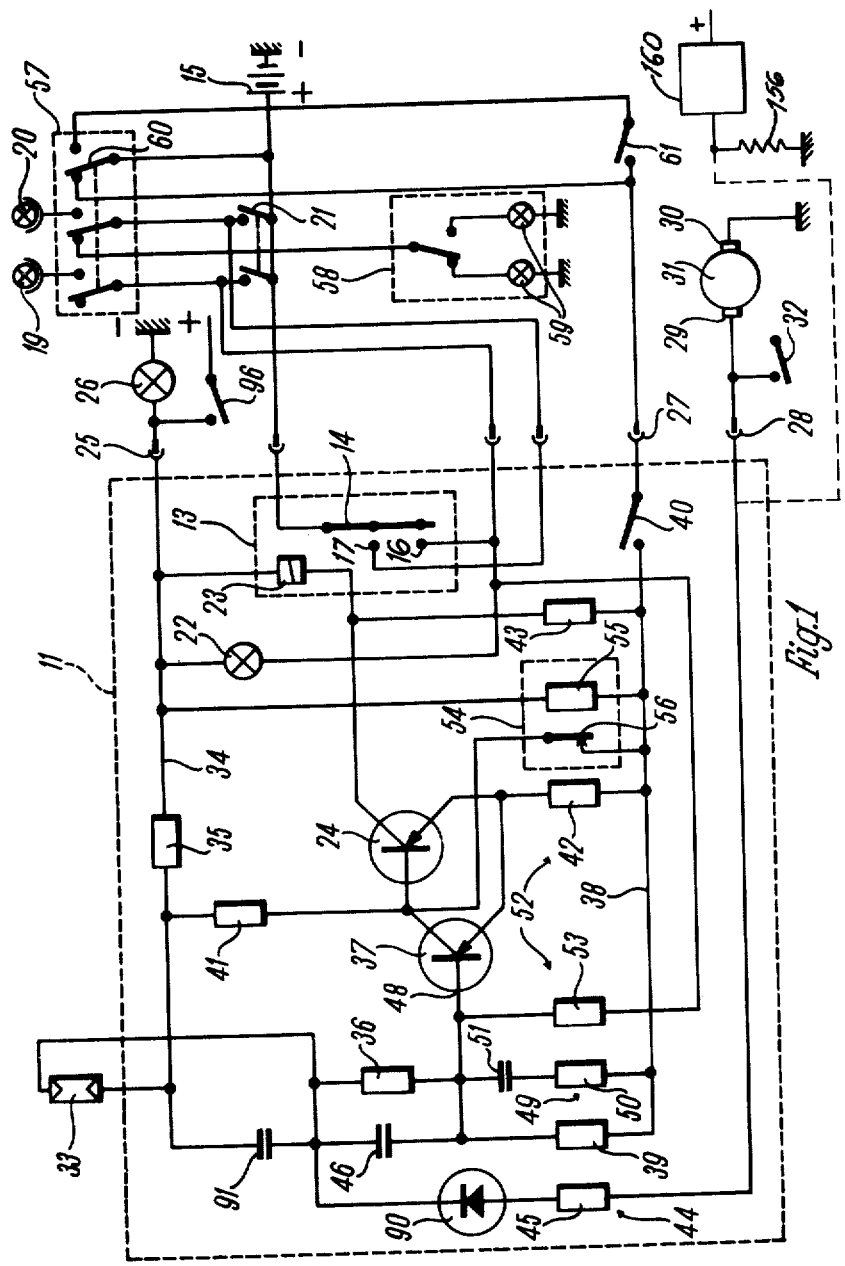

United States Patent [19]
Faller

[11] 3,879,617
[45] Apr. 22, 1975

[54] LIGHTING SYSTEMS FOR VEHICLES
[75] Inventor: Hermann Faller, Guetenbach, Black Forest, Germany
[73] Assignee: Gebr. Faller AG, Augst near Basel, Switzerland
[22] Filed: Sept. 6, 1973
[21] Appl. No.: 394,847

[30] Foreign Application Priority Data
Sept. 16, 1972 Germany.............................. 2245568

[52] U.S. Cl.............. 307/10 LS; 315/149; 307/117
[51] Int. Cl. ........................................... H05b 39/00
[58] Field of Search .......... 307/10 R, 10 LS, 77, 82, 307/83, 83.1, 116, 117; 315/149, 156; 340/22; 250/206

[56] References Cited
UNITED STATES PATENTS

| | | | |
|---|---|---|---|
| 2,888,611 | 5/1959 | Matkins........................... | 307/10 LS |
| 3,500,119 | 3/1970 | Price................................. | 15/250 X |
| 3,591,845 | 7/1971 | Vanderpoel et al............ | 307/10 LS |
| 3,600,596 | 8/1971 | Aloisantoni..................... | 315/77 |
| 3,629,649 | 12/1971 | Del Zotto ....................... | 315/77 |

FOREIGN PATENTS OR APPLICATIONS
258,140 11/1967 Austria .............................. 307/10

*Primary Examiner*—Robert K. Schaefer
*Assistant Examiner*—M. Ginsburg
*Attorney, Agent, or Firm*—Brumbaugh, Graves, Donohue & Raymond

[57] ABSTRACT

An automatic control device for the exterior lighting system of a motor or like vehicle contains a Schmitt trigger whose switching-off threshold is higher than its switching-on threshold to provide a switching hysteresis and also contains a switching delay device for delaying the trigger response, whereby long term slight fluctuations and short term greater fluctuations in the environmental illumination through which the vehicle is being driven do not cause repeated switching on and off of the vehicle lamps.

Means may be provided for displacing the switching threshold when the vehicle windshield wipers are switched on, whereby the vehicle lamps are first switched on at a somewhat brighter environmental illumination when it is raining or snowing.

36 Claims, 12 Drawing Figures

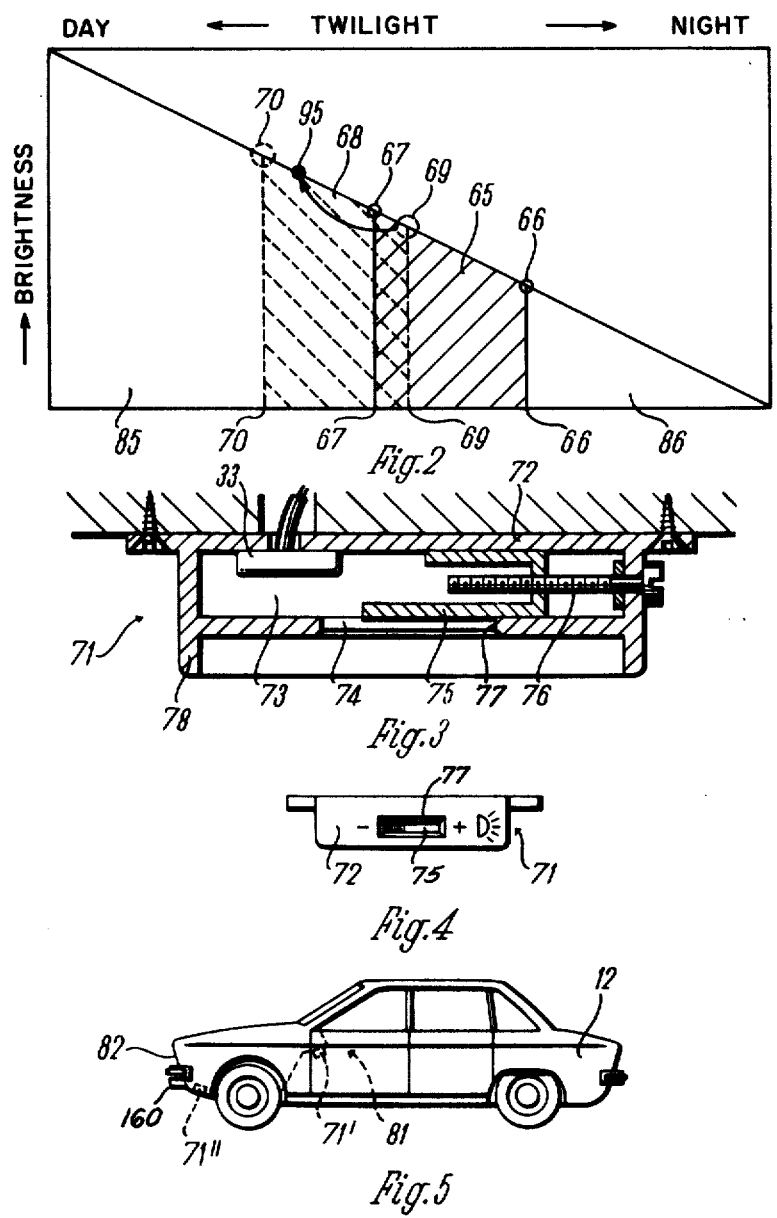

LIGHTING SYSTEMS FOR VEHICLES

The invention relates to an automatic control device for the exterior lighting system of a vehicle, such as a motor vehicle, which effects the switching on or off of the exterior lighting system of the vehicle as a function of the outdoor brightness or environmental illumination falling upon a light sensor.

As is well known, the exterior lighting system of a vehicle is, during darkness, in fog or in rain, the most important factor in making the vehicle visible to other road users. This function of the exterior lighting system of a vehicle is in most traffic situations even more important than the illumination of the roadway lying ahead of the driver. Unfortunately it is just in situations, where the lighting of the roadway is less important, for example in heavy rain on relatively well-lit town roads, etc., that the switching on of the exterior lighting is frequently forgotten, which may lead to accidents.

It has frequently been attempted therefore in the past to produce an automatic control device for the automatic switching on of the exterior lighting system of a motor vehicle. Until now, however, none of these devices has led to an effective application in practice, since the efficiency was too inadequate or too unreliable for entrusting to the automatic device alone such an important task as the switching on of the lighting. The problems that arise are for example that in the case of transient differences in brightness, for example when the vehicle passes through archways, some dense groups of trees or else at the passing of bright lights, a switching on or off of the vehicle lighting is effected. Such as flashing of the lighting would be exceedingly distracting and also dangerous in traffic, since it would divert the concentration of other road users or would be wrongly regarded as the giving of signals. Moreover it was a great disadvantage in previous devices that slight fluctuations in brightness lasting over a longer period in the twilight phase caused the switching on and off of the light with the same detrimental consequences as described above.

It is a feature of the invention therefore to provide an automatic control device which is not affected by such slight and/or temporary changes in the outdoor brightness and which allows satisfactory adaptation to the circumstances of the traffic, i.e., automatically acts in the manner of an attentive and deliberate driver.

In accordance with the invention a control device for the exterior lighting system of a vehicle comprises a threshold value switch responsive to the light sensor and adapted to effect a switching off only at a greater environmental brightness than that at which the switching-on occurs, and a switching delay device which at an environmental brightness above or below the switching-on or switching-off environmental brightness causes a delay in the switching off or the switching on, respectively.

The threshold value switch prevents the exterior lighting system of the vehicle, once it has been switched on owing to the brightness falling below a certain value, from being immediately switched off again when there is a slight increase in brightness. Other, constant switching on and off would occur in twilight. Similarly, the switching delay device ensures that also in the case of greater differences in brightness which, however, are only of short duration, a switching on and off respectively does not take place. There characteristics which are achieved automatically when the switching is done by hand, namely in that the driver either does not perceive any difference in brightness or that he does not feel induced to act, make the control device practically useful.

It has been found advantageous for the delay time of the switching delay device to be greater at switching off than at switching on. If this is so, the lighting will be switched on soon after a dark area has been entered, whilst the lighting will remain switched on a little longer on leaving this area, for the case of another dark area following shortly after.

The control device may include a switching threshold displacement device responsive to switching on of windshield wipers of the vehicle for causing an increase of the values of the environmental brightness at which the switching on and off of the external lighting system takes place. This takes into account the fact that in rain, thick fog or snow the switching on of the lighting system is recommended or prescribed, even if light conditions in general are quite good. This characteristic substantially contributes to ensuring that the control device, without intervention by the driver, will always do the correct thing.

Figure 6:
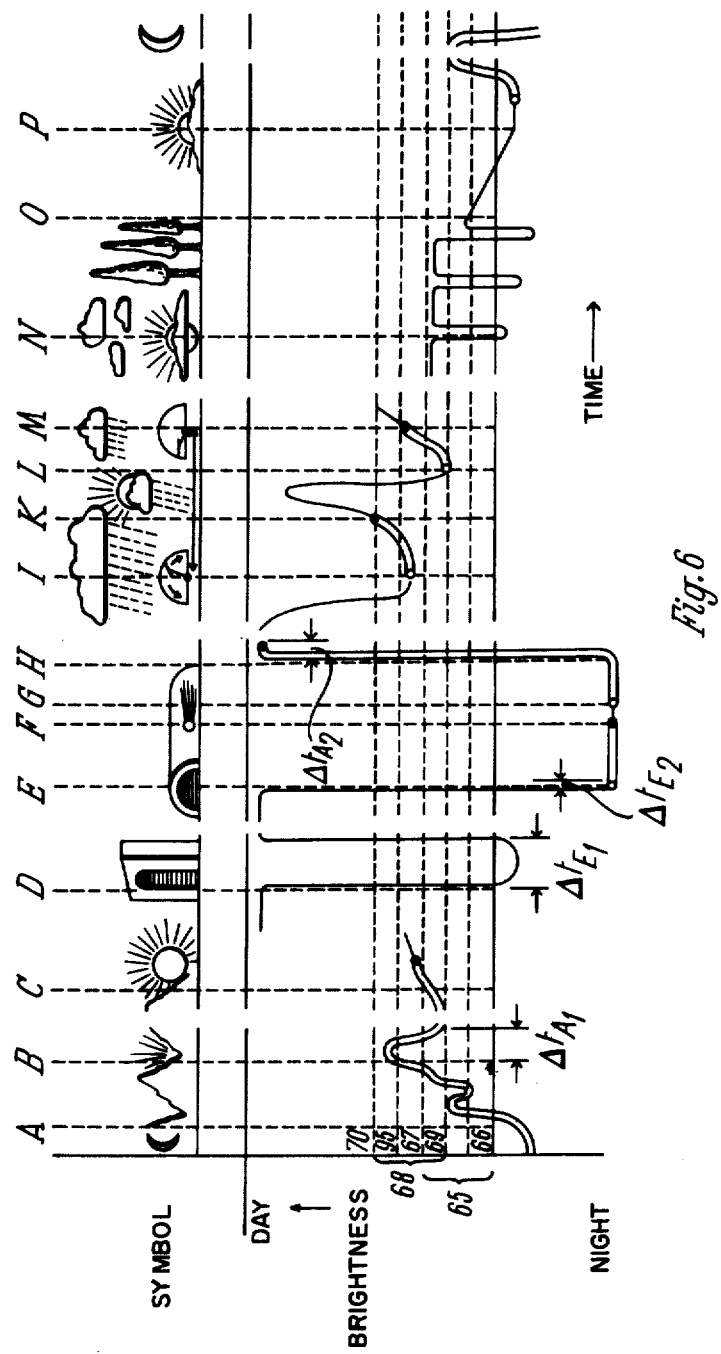
Figure 7:
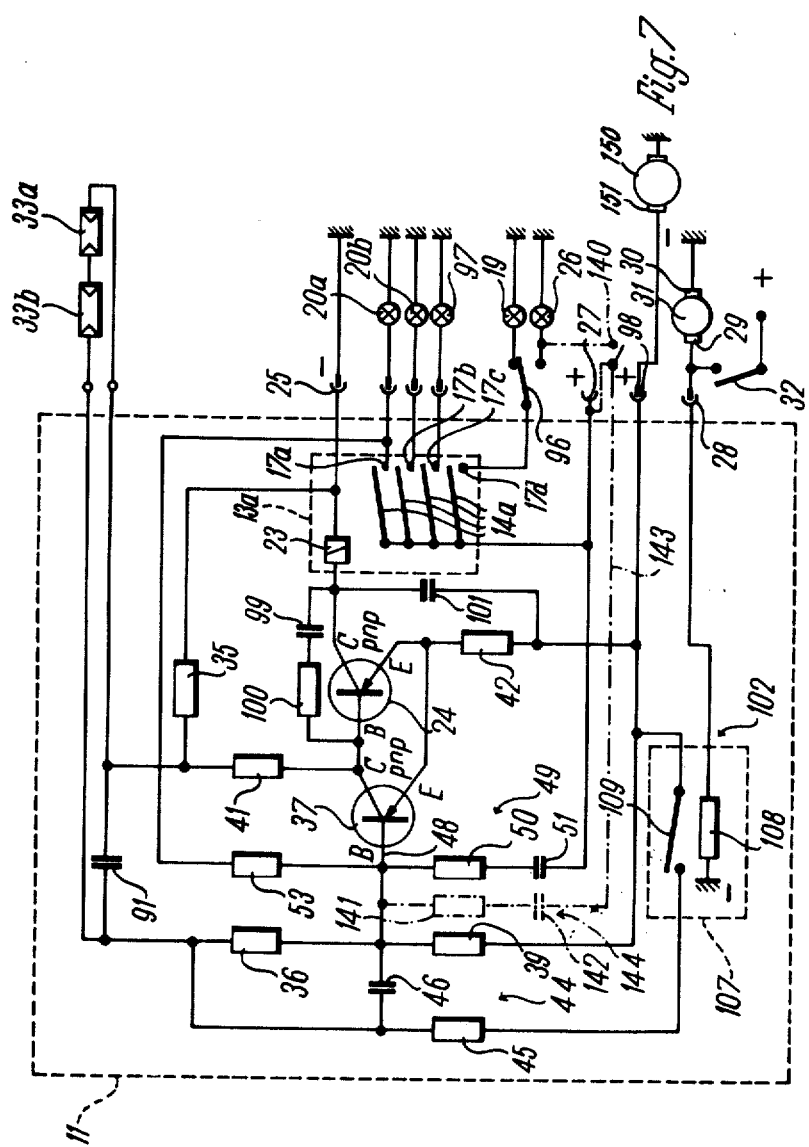
Figure 8:
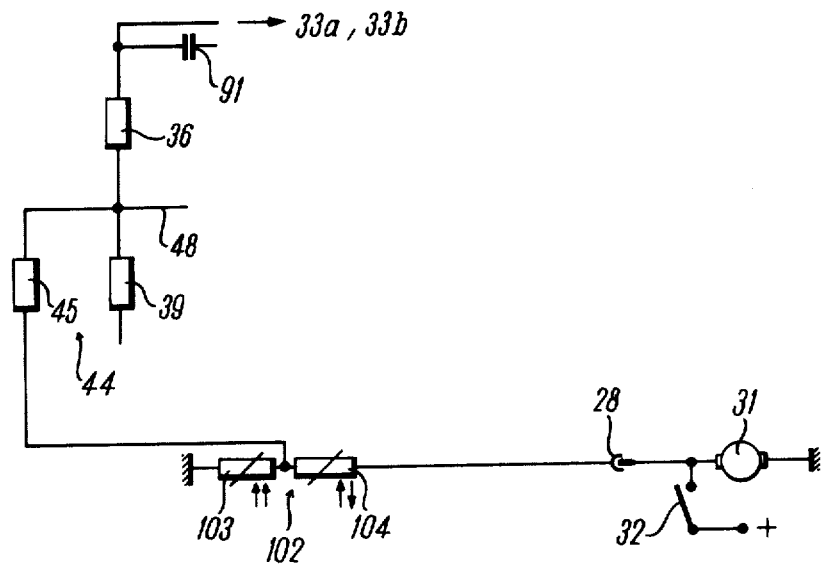
Figure 9:
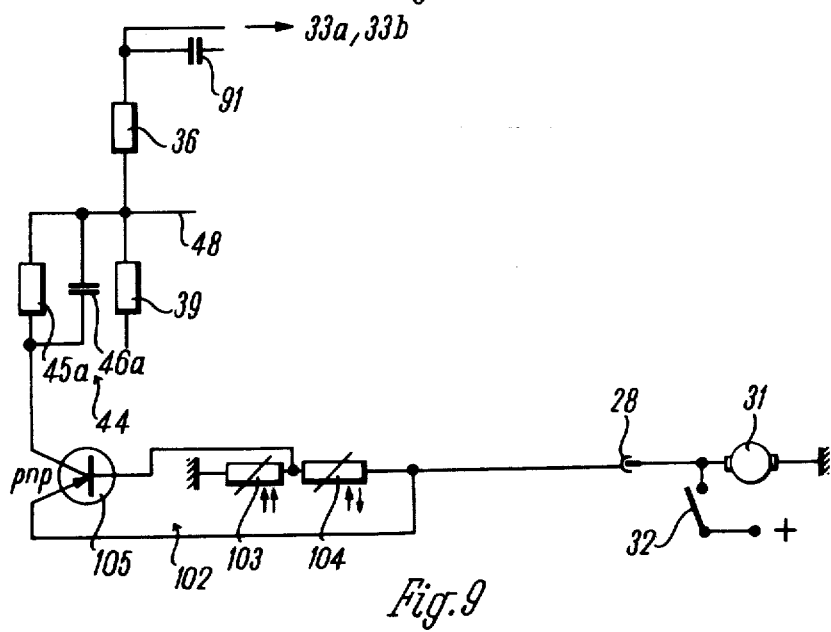
Figure 10:
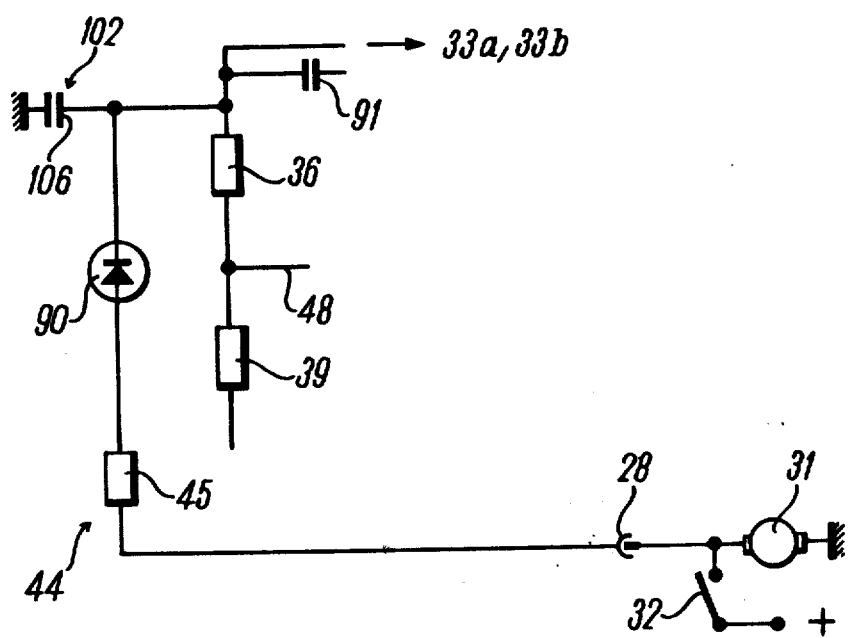
Figure 11:
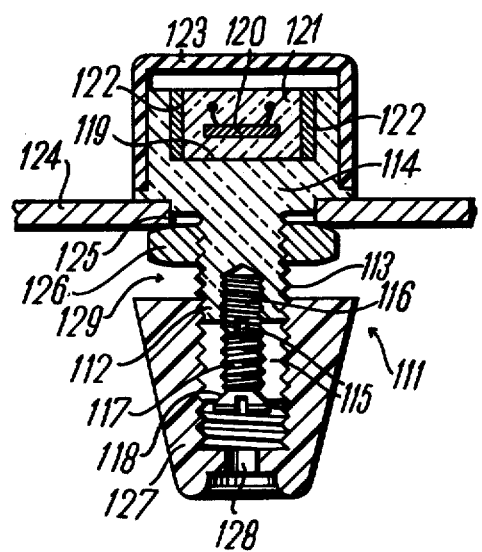
Figure 12:
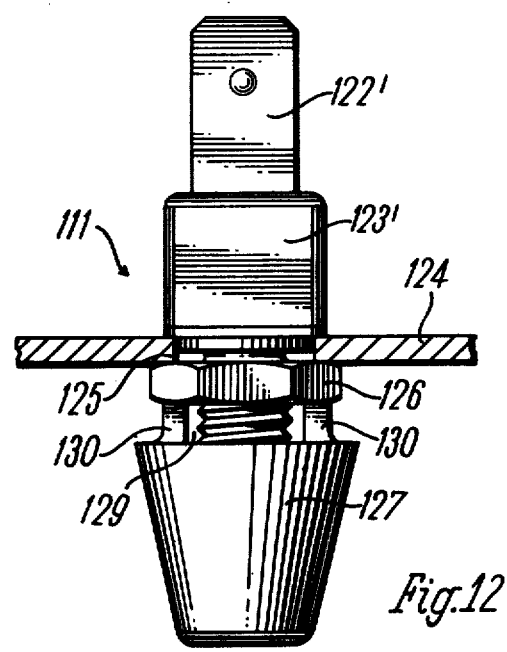

The invention is further described, by way of example, with reference to the accompanying drawings, in which:

FIG. 1 is a schematic circuit diagram of a control device in accordance with the invention and a part of a lighting system of a motor vehicle, FIG. 2 is a graph to illustrate the manner of operation of the device, FIG. 3 is a longitudinal section through a light sensor and its housing, FIG. 4 is a front view of the light sensor of FIG. 3, FIG. 5 is a schematic view of a motor vehicle illustrating two possibilities of attachment of the light sensor, FIG. 6 is a graphical representation of a vehicle journey to illustrate the manner of operation, FIG. 7 is a circuit diagram of another embodiment of the control device according to the invention, FIGS. 8 to 10 are variants of a detail from FIG. 7, FIG. 11 is a longitudinal section through another embodiment of a light sensor, and FIG. 12 is an elevation of an embodiment modified in relation to FIG. 11.

In the following, the device is described in its most important application on a motor vehicle, although it can be used also for other vehicles carrying lights, for example, rail vehicles.

The circuit diagram of an electronic control device 11 is shown in FIG. 1 and is connected to the lighting system of a motor vehicle 12 (FIG. 5). The control device comprises a switching relay 13, the contact blade 14 of which, when the relay pulls in, connects the positive pole of the vehicle battery 15 to contacts 16, 17. The contact 16 switches on low beam lamps 19 only one shown in FIG. 1 and a pilot lamp 22 and the contact 17 switches on the side lamps and tail lamps 20 only one shown in FIG. 1 regardless of the normal light switch 21 of the vehicle. The solenoid coil 23 of the relay 13 is connected to the collector of a transistor 24. The control device 11 is connected to the chassis of the vehicle to which the negative pole of the battery 15 is connected from a terminal 25 via the main beam lamp filaments 26. A terminal 27 of the control device 11 is connected, in a manner to be explained latter, to the positive pole of the battery 15. A terminal 28 of the control device 11 is connected to the positive terminal 29 of a windshield wiper motor 31, the negative terminal 30 of which may be connected to earth. The positive terminal 29 of the windshield wiper motor 31 may be connected in the customary manner via the normal windshield wiper switch 32 of the motor vehicle to the positive pole of the battery 15 in a lead (not shown).

A light sensor 33 is also connected to the control device 11 and in the embodiment shown comprises a photoresistor and is arranged, in a manner to be explained later, on the motor vehicle 12 so that it experiences the environmental illumination in which the vehicle is situated, preferably so that the chances of direct artificial light falling on the sensor are small.

The circuit of the electronic control device 11 is constructed as follows:

The light sensor 33 is located in one branch of a voltage divider circuit, that is in the negative branch 34 connected to the terminal 25. The branch 34 of the voltage divider circuit comprises, besides the photoresistor 33, two resistors 35, 36 connected in series therewith and is connected to the base 48 of a transistor 37 forming the input of a Schmitt trigger. The other branch 38 of the voltage divider circuit contains a resistor 39 and is connected by a switch 40 for switching on and off the control device 11 to the terminal 27, i.e., the positive pole of the battery.

The collector of the transistor 37 is connected to the base of the transistor 24 forming the output circuit assembly of the Schmitt trigger. This base is connected via a resistor 41 and the resistor 35 to the negative terminal 25. The emitters of the two transistors 24 and 37 are connected via a resistor 42 and the switch 40 to the positive terminal 27. The transistors 24 and 37 of the Schmitt trigger are *pnp* transistors. A resistor 43 which connects the terminal 27 to the collector of the transistor 24, serves as a protective resistor for the transistor against induced transient voltages which may be formed when the relay 13 is switched off.

The terminal 28 leading to the windshield wiper motor is connected to the voltage divider circuit via a switching threshold displacement device 44. The device 44 comprises a resistor 45 which is inserted between the terminal 28 and a point of the voltage divider branch 34 located between the photoresistor 33 and the resistor 36. A capacitor 46 is connected between this point and the base 48 of the transistor 37, that is, in parallel with the resistor 36. Furthermore a diode 90 is connected in series with the resistor 45 to isolate the negative potential which would reach the control device via the winding of the windshield wiper motor 31.

Moreover a switching delay device 49 is provided and comprises a resistor 50 and an electrolytic capacitor 51 in series. These are connected in parallel with the resistor 39 between the base 48 of the transistor 37 and the terminal 27.

An electrolytic capacitor 91 is connected in parallel with the light sensor 33.

Furthermore the control device 11 includes a threshold device 52 which in addition to the aforementioned resistor 42 also comprises a resistor 53 which is inserted between the base 48 of the transistor 37 and the terminal for the low beam lamps' i.e., the contact 16.

The control device 11 moreover includes a switching on delay device 54 which comprises a thermal relay with a heating resistor 55 and a switch contact 56, which in the unheated state connects the base of the transistor 24 and the collector of the transistor 37 to the positive terminal 27.

Besides the control device 11, FIG. 1 shows a change-over switch 57 which can be manually set to a parking light position (shown in FIG. 1) or a driving position. In the parking light position shown the leads from the low beam lamps 19 and the tail lamps 20 respectively (the side lamps are not shown for the sake of clarity) to the contacts 16 and 17 on the relay 13 are separated, and one of the contacts, that is, the contact 17, is connected to a parking light switch 58 which is normally present in the car. By means of this parking light switch the two parking lamps 59 on each side of the vehicle (only one on each side shown in FIG. 1) can be switched optionally to one or the other of the two sides of the vehicle. The change-over switch 57 moreover comprises a contact arm 60 which, in the parking light position, connects the positive pole of the battery 15 directly to the terminal 27, whilst in the other position, assumed during driving or when parking without operation of the parking lamps, the positive pole is connected via the ignition switch contact 61 to the terminal 27.

FIG. 2 is a graph on the basis of which the operation of the system will be hereinafter explained. In this graph a normal brightness threshold range is shown by a hatched field, the brightness decreasing from left to right. The limit of the field on the low brightness side, i.e., directed towards "night" is represented by the switching-on point 66 and the limit in the direction of greater brightness is represented by the switching-off point 67. Furthermore, by broken lines and broken hatching, a shifted brightness threshold range 68 is indicated the corresponding points 69 and 70 of which signify the shifted switching-on and switching-off points 69, 70.

A light sensor 71 is shown in FIG. 3 and comprises a photo-resistor 33 enclosed in a housing 72. This may be a simple plastics housing which can be attached by screws to the required point on the vehicle chassis. The photo-resistor 33 is arranged in a chamber 73 which receives light from below via a light entry aperture 74. A control slide 75 is arranged in this chamber and can be displaced by means of an adjusting screw 76 in such a way that it obturates the light entry aperture 74 to a greater or lesser extent. From FIG. 4, which shows the housing in approximately natural size, it can be seen that the position of the slide 75 can be observed from the outside through a window 77, so that the adjustment can be read on a scale fitted there. An edge 78 (FIG. 3) pointing downwards protects the aperture 74 from lateral dazzling light.

FIG. 5 shows a motor car 12 in the interior 81 of which a light sensor 71' is arranged, that is in the region of the front foot space, near the upper limit of the same and with the light entry aperture pointing downwards. Here the light sensor is best protected against fouling and glare. A further possibility of attachment is represented by the light sensor 71" which is shown behind the radiator grille 82 with its light entry aperture directed downwards. It is indicated, that by a particular long design of the edge 78, or some other hood-like covering, the danger of fouling is kept to a minimum.

It is essential in any case that the light sensor at such points is best protected not only against fouling and direct light, but also against wilful or accidental displacement.

It is also possible and advantageous, however, to fit more than one light sensor in the motor vehicle, for example, two light sensors 71' and 71''. It should be ensured that the two light sensors are arranged in such a way that possible influences on their indication in relation to the actual brightness value cancel each other out.

The operation of the device in accordance with the invention will now be described.

As already mentioned, the light sensor 33 in the form of a photoresistor is located in a branch of a voltage divider circuit. Such photoresistors may alter their resistance within a very wide range as a function of the brightness. Thus, for example the resistance of the light sensor 33 at solar radiation may be 50 Ohm; in complete darkness, however, it may be 10 M Ohm. In the switched-off condition shown in FIG. 1 the device is carrying no current, since on the one hand the switching relay 13 is open and on the other hand the control device is cut off by means of the switch 40. The switching-on delay device is effective, i.e., the switch contact 56 is closed. Now, when the control device 11 is switched on by switching on the switch 40, the control device still remains out of operation, since the switch contact 56 is closed. Only when the current flowing through the resistor 55, for example after approximately 30 seconds, opens the switch contact 56, which may for example consist of bimetal, can the control device become effective. In the case shown, where switching-on takes place by means of the switch 40, since the change-over switch 57 is on parking position, this delay would in fact not be necessary, but it would become so if the control device 11, with (normally always) closed switch 40 were to be taken into operation together with the engine through closing of the ignition contact 61.

Let us assume that the motor car 12 is in adequate conditions of light, i.e., in the brightness range 85 in the graph of FIG. 2. The light sensor 33 has then a relatively low resistance, so that the voltage on the base 48 of the transistor 37 is negative, i.e., is in the region in which the transistor 37 is conductive. Thus, substantially the voltage on the emitters of the transistors 37 and 24, connected via the resistor 42 to the positive terminal 27, is applied to the base of the transistor 24 which thus blocks the current flow from its emitter to the coil 23 of the switching relay 13. Thus the contacts of the relay remain open and the lighting system remains switched off. The voltage divider circuit is dimensioned so that the above state is maintained up to the switching-on point 66. If the brightness falls below the level corresponding to this point, i.e., in the darkness range 86 in FIG. 2, the resistance of the light sensor 33 and consequently of the branch 34 of the voltage divider circuit increases to such an extent, that the voltage on the base 48 of the transistor 37 is shifted so far in the positive direction that the transistor 37 is blocked. It then blocks the path from its emitter to its collector, so that the base of the transistor 24 is connected via the resistors 41 and 35 and via the filaments of the main beam lamps 26 to the negative pole of the battery. The transistor 24 thus becomes conductive and a current flows via the resistor 42, the emitter of the transistor 24, its collector, the coil of the switching relay 13 and the main beam lamps 26, which current causes the relay 13 to pull in and the contact arm 14 to connect with the contact 16, 17. As a result, in the position of the change-over switch 57 of FIG. 1, the parking lamps 59 are switched on. It can be recognized, however, that during driving, when the change-over switch 57 is in its other position, the low beam lamps and the tail lamps as well as the side lamps (not shown for the sake of clarity) will be lit. Furthermore, the pilot lamp 22 will be on.

Now, when the brightness again increases a little, that is when the motor vehicle enters the brightness threshold range 65, the threshold device 52 becomes effective so as to prevent the exterior lamps 19, 20 or 59 respectively from immediately switching off again. It would be very irritating if the lamps were to be switched on and off repeatedly when, for example the vehicle is driving along dips in a road, which would cause the brightness to constantly fluctuate about the switching point 66. As the relay 13 is closed, the positive pole of the battery 15 is connected via the resistor 53 to the base of the transistor 37. As a result the voltage divider ratio is shifted and the voltage on the base 48 has a greater tendency to become positive, i.e., the transistor 37 remains blocked. The threshold value displacement device 52 is dimensioned so that at the switching-off point 67, i.e., at the brighter end of the brightness threshold range 65, the same voltage value exists on the base 48 of the transistor 37, as existed without insertion of the threshold value displacement device at the switching-on point 66. Thus the transistor 37 becomes conductive with the result that the transistor 24 is blocked and the switching relay 13 drops out.

However, the threshold value displacement device 52 comprises a circuit which may be constructed in a still simpler and more effective manner that omits the resistor 53 added via the relay. By a high-ohmic dimensioning of the resistors in the voltage divider circuit a voltage drop is produced, on the transistor 24 becoming conductive, by the current flowing through the emitter of the latter and the resistor 42 and the coil 23 of the relay 13, which voltage drop together with the voltage divider circuit shifts the base voltage as a function of the switching condition. Thus, a switching hysteresis is created by a suitable dimensioning of the resistors 35 and 41 and of the resistor 42.

By means of the switching delay device 49 the exterior lighting system is prevented from being switched on or off by the control device 11 when driving merely through a very short zone of great darkness or great brightness. Thus, for example, on driving through an archway or the very deep shadow of a tree the lighting system must not yet be switched on even though the brightness as such would give rise to a switching on. On the other hand the lighting system should not yet be switched off if, for example, a free stretch occurs when driving between two tunnels. Also in the twilight phase the occurrence of intense but short shadows or strips of light should not yet give rise to switching. The capacitor 51 with the series resistor 50, which forms part of the switching delay device 49, is charged in such a manner that its discharge will give rise to an extension of the existing state on the base 48 of the transistor 37. By this means, a delay from 5 to 10 seconds can be achieved. Since the charging or discharging of the capacitor 51 occurs via the light sensor 33, the switching delay will be a function of the brightness value prevailing during charging or discharging respectively of the capacitor, since the photoresistor than allows a rapid or less rapid discharge. At greater brightness the delay is smaller than at low brightness. Thus on driving from a tunnel into bright sunlight the external light will switch off relatively quickly, whilst a bright gap between two sections of forest in twilight will lead to a greater delay. It may be mentioned that the re-charging of the capacitor 51 also entails a certain delay in switching-on, but it serves primarily to produce a delay in switching off.

The switching-on delay is caused by the electrolytic capacitor 91. When the vehicle suddenly passes into a dark zone the resistance of the light sensor 33 rises steeply so that the stable voltage drop on the capacitor 91 is increased and the latter becomes charged. During the charging time which is a function of the capacitance of the electrolytic capacitor and the resistances in the circuit, the existing condition on the base 48 is maintained and a switching on of the lighting system is omitted although the brightness has dropped below the switching-on point. When sudden brightness sets in, however, the charge on the capacitor 91 is discharged via the now low-ohmic light sensor 33. It can be seen that in the switching-on delay too the brightness value during the delay period affects the duration.

The threshold value displacement device 44 operates as follows: So long as the windshield wipers are switched off, the diode 90 cuts off the connection from the windshield wiper motor 31. If now the windshield wiper switch 32 is closed, the positive pole of the battery is connected to the terminal 29 of the windshield wiper, so that positive polarity is also imparted to the whole branch belonging to the threshold value displacing device 44, and, since the diode 90 is conductive in this direction, the voltage divider circuit is shifted towards positive polarity with respect to the base 48 of the transistor 37. This is equivalent, however, to an increase in the resistance of the light sensor 33, so that a lower brightness is simulated for the switching. Hence, the switching-on and switching-off points shift towards the values 69 and 70 shown in FIG. 2 and the threshold range 68 now lies between these two points.

However, as the capacitor 46, prior to the actuation of the windshield wiper was connected to earth via the light sensor 33 etc., the electrolytic capacitor 46 on actuation of the windshield wipers is connected by the switch 32 and the resistor 45 to the positive pole of the battery 15. Consequently a short positive voltage jump is applied to the base of the transistor 37 and blocks the transistor 37 which in turn switches on the output transistor 24 of the Schmitt trigger and so causes the relay 13 to pull in and switch on the lighting system. By suitable dimensioning of the resistor 45 this advancing of the switching on can be varied in magnitude. Normally it will be adjusted so that it becomes effective only when the brightness is within the shifted threshold range 68. In FIG. 2 this advance of the switching-on point is indicated by an arrow and the maximum brightness where immediate switching-on occurs when the windshield wipers are actuated is marked 95.

It has already been mentioned that it is advantageous to connect the terminal 25 to earth via the main beam filaments 26. This brings about a further substantial advantage. If by closing of the main beam switch, with the control device 11 switched on, i.e., with the low beam lamps 19 on, the main beam is now switched on, positive polarity is applied to the terminal 25 instead of negative polarity. Consequently no current can flow anymore to the control device 11, and in particular both transistors 24 and 37 remain blocked. This means that the relay 13 drops out so that, as desired and prescribed, the low beam lamp is not lit at the same time as the main beam. Naturally the tail lamps and also the side lamps remain on. These are switched on together with the main beam. Switching off of the main beam restores the original state.

In FIG. 6 the manner of operation of the device of the invention is illustrated in the form of a practical example. In FIG. 6 in the top section various events or circumstances are represented by symbols which may have an effect on the device. In the graph, the brightness is plotted vertically and the progress of time is shown from left to right, the curve indicating both, variations in brightness and the state of switching. A single line signifies that the low beam lamps are off, whilst the double line means that the low beam lamps are switched on. In horizontal direction, moreover, the switching limits 66, 67, 69, 70, 95, recognizable from FIG. 2, are indicated as well as the threshold ranges 65 and 68 situated in between them.

A vehicle driving with the control device 11 switched on at night, the control device having switched on the low beam lamps, enters the twilight range, i.e., the threshold range 65 at point A. Owing to the switching value delay or the hysteresis brought about by the threshold value device, however, the lighting system is prevented from being switched off. Also fluctuations in brightness in this range, which may be produced for example by the shadows of trees etc., do not give rise to switching. At point B, the vehicle passes an opening between mountains through which a little brightness from the rising sun already reaches the road. This results in a transitory exceeding of the switching-off point 67 which limits the brightness threshold range 65 at the upper end. Since, however, the increase in brightness is relatively small, the time delay $\Delta t_{A1}$ caused by the switching delay device 49 is greater than the duration of the excess, so that no switching off of the lighting system takes place. Only when the vehicle at point C leaves the brightness threshold range 65 for a prolonged period of time, a switching off of the low beam lamps takes place at the moment in time marked by a black dot. The threshold value device and switching value delay similary prevent untimely switching of the lights during the night by a light beam from a passing vehicle.

In the further course of the representation, a vehicle driving along in bright daylight enters at point D a transitory darkness zone which however is not very intense. It is symbolized by an archway. Brightness now drops below the switching on point 66, so that normally a switching on the dipped beam lamps would occur. This is prevented again by the switching delay device 49 which, owing to the relatively small degree of dropping below the switching-on point 66, creates a relatively large switching-on delay $\Delta t_{E1}$. Since the time needed for passing through the archway is smaller than this time delay, no switching-on occurs. In the further progress of the curve a vehicle drives from bright daylight at point E into a relatively low tunnel where darkness prevails. Since during the delay time now setting in a very small brightness value exists, the switching-on delay $\Delta t_{E2}$ too is very small, so that shortly after driving into the tunnel the dipped beam lamps are switched on which is symbolized in the drawing by a circle. At a point F the driver in the tunnel switches the main beam on. As a consequence the low beam is switched off and is switched on again (at point G) only when the driver has switched off again the main beam. At point H the vehicle leaves the tunnel into bright daylight. Owing to the very great difference in brightness the switching delay equipment 49 makes the switching-on delay $\Delta t_{42}$ very small, so that the dipped beam lamps are switched off shortly after leaving the tunnel. It is worth mentioning, however, that the comparable delays of the switching-on should be kept smaller than the corresponding switching-off delays, so that on entering the dark region the light comes on with the shortest possible delay. This is quite possible by an appropriate dimensioning of the capacitor 51 and 91 in FIG. 1.

A vehicle shown in the further course of the representation in FIG. 6, driving in daylight with the lighting system switched off, gets into bad weather, in the course of which the brightness diminishes considerably, but does not reach the normal brightness threshold range 65 and certainly not the switching-on point 66. The brightness in fact lies in the shifted threshold range 68, or more accurately, between the switching on points 66 and 95. At point I it starts to rain and the driver switches on the windshield wipers. As a result of this the threshold value displacement devive 44 becomes effective for the shifting of the switching points from 66 to 69 and from 67 to 70, and moreover the capacitor 46 effects in the manner described above a shifting upwards of the switching on point to point 95. The lighting system is switched on therefore and remains switched on as long as the vehicle is in the shifted threshold range 68. At point K the windshield wipers are still on, but the brightness has become so great again that the visibility is good and the vehicle moves out of the shifted brightness range 68. Consequently the lighting system is switched off. With the windshield wipers still on, the vehicle now moves once more into the shifted threshold range 68. Since the windshield wipers are still on, an immediate switching-on does not take place but only when the brightness has dropped below the shifted switching-on point 69 (point L). It should be noted, however, that the driver, by a short switching on and off of the windshield wipers can influence the automatic device 11 accordingly. Furthermore, it may be mentioned that the connection to the windscreen wipers is normally effected in such a way that a pulse switch, that may possibly be provided for intermittent windshield wiper operation, does not produce each time an upwards and downwards shifting of the threshold region. Here it is advantageous, in fact, not to connect the automatic device directly to the windshield wiper motor, but to adapt it so that it is affected only by the windshield wiper switch.

After the lighting system is switched on at point L, the outdoor or environmental light becomes brighter again and the brightness value moves into the range 68. Now if the driver, after rain has stopped and the road has become drier, switches off the windshield wipers at point M, the lighting system too will be switched off, since now the threshold range 65 applies and the switching off point 67 has been exceeded.

In the further course of the curve, the vehicle drives into evening twilight, with the average brightness being in the normal threshold range 65. The lighting system therefore remains switched off, even if the vehicle between the points N and O for example passes through an avenue of big trees whose shadows produce a transitory dropping of the brightness value below the switching point 66. The duration in time of such dark zones amounts to less than the switching-on delay $\Delta t_E$, which in the present case is relatively great. Only if the brightness around the vehicle at the point P keeps below the brightness of the switching-on value 66 for a slightly longer time, a switching on takes place. Subsequently also a somewhat longer lasting increase in brightness which remains in the region 65 no longer causes the lighting system to be switched off.

Several variations of the embodiment are possible. Thus, for example, instead of several light sensors one single light sensor may be used to which light is supplied from several points via light conducting filaments.

It is very advantageous and reliable to actuate the threshold value displacement device by the switching-on of the windshield wipers. But it is also quite possible to connect a moisture probe 160 as shown in FIG. 5 to the control device which causes the shifting of the switching value, e.g., terminal 28 could be moved to the junction of the moisture probe 160 and resistor 156 in FIG. 1.

In FIG. 7 an embodiment of the invention is shown which has the same basic structure as the embodiment of FIG. 1 but incorporates a few modifications in relation to that circuit. For the sake of simplicity similar parts have been provided with similar reference numerals as in FIG. 1, and the description of the circuit therefore limits itself to the differences.

In this embodiment the tail lamps 20a and the side lamps 20b (divided into right and left) as well as a number-plate lamp 97 are connected to the control device in addition to the low beam lamps 19 and the main beam lamps 26. The change-over between low beam and main beam is performed by a switch 96 which as usual is operated by hand. The earth connection (negative pole) 25 in this case does not lead via the main filaments. The connection to the positive pole of the vehicle battery is made via the terminal 27, whilst an additional terminal 98 is provided which is connected to the output terminal 151 of the vehicle generator 150. Consequently the switching-on delay device 54 can be omitted, since the control device only becomes effective when the generator has an output voltage, i.e., after the engine has started.

To the control device are connected two photoresistors 33a, 33b connected in series. They are located at two points which are spaced some distance from one another in longitudinal direction of the vehicle, for example, as shown in FIG. 5, one in the light sensor housing 71' and one in the housing 71''. They may also be even farther apart, in that, for example, one is located in the region of the front radiator grille and one in the region of the vehicle rear end. This arrangement ensures, that also at very slow driving or at standstill of the vehicle in a transistion zone between darkness and brightness, a quick response of the control device takes place. When for example a vehicle has already entered a garage with its front part whilst the rear of the vehicle still receives brightness, the light sensor at the vehicle front which is in darkness would exhibit such a high resistance, that the control device would already respond and would switch on the vehicle lighting system. On the other hand, when leaving the garage, the vehicle lighting system would be switched off only after the last light sensor too has come out into brightness and thus its resistance has become greatly reduced. In such an arrangement it is also not so important to ensure that the light sensors are protected from glare, etc. It is only important to install them at points which are so different, that for example the headlamp beam of a following car would reach only one of the light sensors. In this case no switching off of the vehicle lighting system would take place.

In the present embodiment a relay 13a is shown which has four contact blades 14a by means of which the aforementioned lamps are switched individually via the fixed contacts 17a, 17b, 17c and 17d. Instead of the separate contact 16, as provided in FIG. 1, the resistor 53 is connected between the base 48 of the Schmitt trigger and the fixed contact 17a. This does not alter its function as a threshold value device which it performs in conjunction with the resistor 42 which, on the output transistor 24 of the Schmitt trigger becoming conductive, causes a voltage drop across the coil 23 of the relay 13a.

An electrolytic capacitor 99 and a resistor 100 are connected in series between base and collector of the output transistor 24 of the Schmitt trigger. The resistor 100 serves essentially only for the protection of the electrolytic capacitor 99 against overvoltage, whilst the capacitor 99 has a double function. In the electrical system of vehicles, voltage fluctuations or voltage peaks may be produced by the actuation of the brake lamps, the indicator, the horn or the switching of the relays of automatic gears etc. which, if they were to act upon the control device, would produce, especially in the twilight zone, i.e., in the vicinity of the switching-on or switching-off point of the vehicle lighting system undesirable switchings, which, at the least, may disturb other road users. Thus if for example under conditions of brightness the input transistor 37 of the Schmitt trigger has become conductive, the output transistor 24 is blocked and the capacitor 99 has potential differences at its two terminals. Should short voltage fluctuations and voltage peaks now occur, the capacitor will act as a buffer and equalize the same. At the same time, however, the capacitor 99 also produces a desired switching-on delay which acts in a supporting manner to the switching-on delay caused by the capacitor 91 or can even fully take over the task of the latter. The size of the switching-on delay depends upon the capacity of the capacitor. Thus if the input transistor 37 on passing through a short dark zone becomes conductive, the output transistor 24 is prevented from becoming conductive for the time of discharge of the capacitor 99 via the resistors 35, 41, 100 and via the relay coil 23. Only when the discharge has taken place will the voltage required for making the output transistor 24 conductive will be present on its base, which voltage is applied via the relay coil 23 to pull in the relay 13a. A further capacitor 101 is connected between the emitter and the collector of the output transistor 24 and serves as an anti-interference component and protects the transistor from induced peak voltages which may arise when the relay 13a is switched off.

The embodiment of FIG. 7 in addition to the threshold value displacement device 44, which becomes effective when the windshield wipers are actuated and which in this case, as in FIG. 1 is formed by the resistor 45 connected to a capacitor 46, contains a time delay component 102. This is installed between the terminal 28 leading to the windshield wipers motor 31 and the resistor 45, and in the embodiment shown comprises a thermo-relay 107, whose heating resistor 108 carries current when the windshield wiper switch 32 is actuated and after the set time closes the normally open contact arm 109, so that a connection is established between the positive generator terminal 98 via the resistors 45 and 36 to the base of the input transistor 37 and thus a shifting of the voltage divider ratio takes place in the direction of switching on of the vehicle lighting system already at a greater brightness. It might be mentioned here, that the division of the positive terminals into the terminals 27 and 98 takes place only for the aforementioned reason, namely that a switching on of the vehicle lighting system should take place only after starting up of the engine. In this embodiment, the thermo-relay 107 obviates the need for the diode 90 required in the embodiment of FIG. 1.

FIGS. 8 to 10 illustrate different embodiments of threshold value displacement devices and in particular of the time delay component 102.

In FIG. 8 the time delay component 102 is formed by two temperature-variable resistors 103 and 104 which are connected in series behind one another and are connected to earth, so that current flows through them when the windshield wiper switch 32 is closed and they are consequently heated up. Whilst the resistance of the resistor 103 increases with rising temperature, the resistance of the resistor 104 decreases with rising temperature. Consequently the previously balanced voltage divider ratio on the base 48 of the input transistor is altered via the resistor 45 which is connected between the two resistors 103 and 104 in such a manner that, after the preselected time value the displacement of the threshold value takes place. In the embodiment of FIG. 9, the resistors 103 and 104 are connected in the same manner and a transistor 105, in this instance a pnp transistor, is connected by its base to the junction between the resistors 103 and 104, by its emitter to the terminal 28 and by its collector to the resistor 45a, which in this case is connected in parallel with a capacitor 46a to the base 48. This embodiment has the advantage, that here, after a pre-determined change in the resistance of the resistors 103 and 104 has been attained, a sudden change of the voltage on the base 48 occurs, so that a precise point at which the transistor 105 becomes conductive is obtained. In connection with thermistors and other time delay elements, numerous other circuits are conceivable, in that for example only one thermistor may be used or, instead of a transistor or, a magnetic relay may be used.

In the embodiment of FIG. 10 the time delay component 102 is formed by an electrolytic capacitor 106 which, with the circuit of the threshold value displacing device 44 otherwise being as in FIG. 1, is connected between the diode 90 and earth, that is the negative pole. When the windshield wipers 32 are switched on, current flows through the relative high-ohmic resistor 45 and the diode 90 to the capacitor 106 and charges the latter. Owing to the high-ohmic resistance of the resistor 45 a certain time elapses until the capacitor is charged. Only when it has been charged, will a sufficient alteration of the voltage divider ratio on the base 48 of the input transistor 37 has taken place in order to make the threshold value displacement device 44 effective. In this embodiment the capacitor 46 may be omitted.

The time delay component 102 ensures, as is already evident from the description, that, on switching on of the windshield wipers, the displacement of the threshold value does not become effective immediately, and thus the lighting system is switched on whilst the outdoor light is still fairly bright. This takes into account the case arising in practice where, under weather conditions which lead to the windshield wipers being switched on for only a short period, either directly by the windshield wiper switch or by actuation of the window washer system or a pulse switch for the windshield wipers, it is generally not yet required to drive with the lighting system switched on. Naturally special cases may arise in which the automatic device cannot easily respond, for example the case of a relatively dry low mist with a very high general degree of brightness. Since the driver will under these circumstances normally not switch on the windshield wipers the threshold value displacement device can also not become effective. For such cases, however, a switch (not shown on the drawing) may be provided which can be actuated manually and which will also produce a displacement of the threshold value.

The light sensor shown in FIGS. 11 and 12 is arranged preferably inside the vehicle, but it may be arranged also on other parts of the vehicle, preferably in places protected from dirt, such as, in the housing of a direction indicator lamp.

The light sensor 111 comprises a light conducting element 112 which has the form of a screw bolt bearing a thread 113 and a thickened end part 114. The light conducting element comprises a transparent material, for example a transparent plastics material. At the end opposite the end part 114 the light conducting element has cross-shaped slots 115 and a central female thread 116 into which can be screwed a screw 117. The latter cooperates with a sloping surface 118 at the end of the screw bolt in such a way that on screwing it in, the parts provided with the thread 113 situated between the slots 115 are spread outwards.

In a recess 119 in the end part 114 is located a photoresistor 120 which is surrounded by a transparent substance 121.

The photoresistor 120 is connected electrically to terminal lugs 122 which in the embodiment of FIG. 11, lead laterally out of the transparent housing 123 which surrounds the end part 114. The terminal lugs 122 are in the form of plug connectors. The light sensor is attached to a part of the car body, for example a sheet-metal plate 124, in such a way that the screw bolt portion with thread is inserted through an opening 125 and is fixed by a fastening nut 126. Thus the portion of the light conducting element provided with thread serves at the same time as a fixing bolt and as a light conducting element.

Onto this screw bolt part a light-obturating part 127 is screwed. In the embodiment shown, it comprises a sleeve in the form of an actuating knob with a female thread and made of a non-transparent material. It can be screwed to a greater or lesser extent onto the thread 113. In its end, closed in the form of a cap nut, is a centre opening 128 through which can be inserted a screwdriver to turn the screw 117.

By screwing in the light-obturating part 127 to a greater or lesser extent, a smaller or large light entry aperture 129 is formed between the fixing nut 126 and the part 127. Thus the point of response of the automatic control device can be adjusted by turning the part 127. The adjustment is carried out by loosening the screw 117, turning the part 127 and subsequent retightening the screw which, through spreading of the part of the thread 113 situated between the slots, effects a locking of the part 127. It is thus ensured that the part 127 cannot be accidentally turned, and in particular cannot be removed. Any effects which otherwise may influence the light sensor, such as, fouling or covering are made very improbable through the design and, in any case, merely give rise to the lighting system being switched on too early which is an effect in the direction of increased safety.

The embodiment of FIG. 12, contrary to that of FIG. 11, has terminal lugs 122' which project to the rear from the housing 123'. For the rest the design is identical, except that the part 127 has stops 130 which set a minimum entry aperture for the light, in that they prevent the complete screwdown of the part 127 onto the fixing nut 126. Such a minimum entry aperture for the light can also be secured by other slots or windows in the part 127.

It has already been described that due to the election of a shorter delay with the switching on of the light than with the switching off, possible darkness periods when entering a tunnel or something else are very short. Another improvement, however, is provided by a means 144 for bridging the switching delay, shown in dot-dash lines in FIG. 7. There the normal switch for headlamp flashing, 140, is shown, with which — for signal purposes — the main beam can at any time be switched on for a short time, even if the normal light is not switched on. There the positive terminal 27 of the vehicle's network is connected to the main beam lamps 26 via the switch for headlamp flashing 140. The means 144, which are in the form of a capacitor 142 connected in series with a resistor 141, are connected to the fixed contact of the switch for headlamp flashing over a circuit 143 and with the base 48 of the input transistor 37 of the Schmitt-Trigger.

With an unswitched headlamp flasher the means 144 lie at negative potential (ground) via the main beam lamps 26. At twilight as well as at the switching delay the base 48 is supplied with a partial voltage of positive potential via the resistor 39. Therefore, the capacitor 142 is charged and has negative potential at the side facing the switch for headlamp flashing 140 and positive potential at the side connected to the base 48. When the switch for headlamp flashing 140 is switched on, the full positive potential is connected to the side of the headlamp flasher. The capacitor 142 changes polarity and must, before it can take the reverse charge, first discharge itself. Because on changing polarity the inner resistance of the capacitor is for a short time approximately zero the base 48 receives, for a short time, the full positive voltage and the transistor 37 switches off so that the transistor 24 becomes conductive and the relay 13a switches on the light. This function, however, is only provided if a partial voltage, different from the negative potential, lies on the base 48, because otherwise no changing of polarity of the capacitor is effected. By operating the headlamp flasher a switching on of the light is only effected if the brightness is already so low that a switching on is already initiated but has not yet been effected because of the switching delay, and/or if the brightness was within the threshold range.

For example, the driver can, like a "kick down" with an automatic gear, accelerate the switching on of the light — when entering a tunnel or something else — by operating the headlamp flasher.

Under certain circumstances the delay of the switching on and off can be selected equally, so that perhaps capacitor 51 and resistor 50 are not necessary. In any case, however, the delay of switching on can be selected relatively long so that with short distances of darkness (underbridges, passages) certainly no undesired switching on is effected. An extension of the switching delay can also be effected by a resistor which is connected in series with the capacitor 91. After releasing the switch for headlamp flashing 140 the capacitor 142 immediately recharging polarity; the light, however, remains switched on and the inner resistance of the charged capacitor has such a high value that no other influences on the whole device can occur. The resistor 141 is responsible for the fact that after releasing the headlamp flasher no switching off of the light can occur. The resistor 141, however, is not necessary in all embodiments.

I claim:

1. Apparatus powered by a d.c. network for the switching on and off a vehicle exterior lighting system as a function of environmental illumination, comprising light sensing means for sensing said illumination and an automatic control device, said control device including:
    threshold value means for switching states in response to said light sensing means, said threshold value means having a switching hysteresis such that it effects a switching off at a greater illumination than that at which the switching-on occurs;
    means for switching said exterior lighting system on and off in response to said threshold value means; and
    switching delay means for delaying the switching off and the switching on at illumination values above and below the switching-on and switching-off illumination values, respectively, said switching delay means having a switching off delay greater than its switching on delay.

2. A control device in accordance with claim 1, in which said threshold value means comprises a Schmitt-trigger containing input and output transistors and a common emitter resistor connected to the emitters of said transistors for producing a voltage drop when the Schmitt-trigger switches on said lighting system for producing said switching hysteresis.

3. A control device in accordance with claim 2 in which means for bridging the switching-on delay of said switching delay means are provided which are effective on operating a switch for headlamp flashing of the vehicle and in which the control device contains a capacitor which is connected between said switch for headlamp flashing on the base of said input transistor of said Schmitt-trigger in such a way that it is discharged on operating said switch for headlamp flashing and is again recharged with reversed polarity.

4. A control device in accordance with claim 2, in which said Schmitt-trigger has a base bias resistor and a voltage divider network connected to the base of said input transistor, and said means for switching comprises a switching relay means controlled by said output transistor, said relay means including contact means for connecting the base of said input transistor via said base bias resistor to one pole of the d.c. network so as to affect the voltage divider ratio when the switch relay means is operated.

5. Apparatus in accordance with claim 1, in which said light sensing means has a light entry aperture and means for adjusting the size of said light entry aperture.

6. Apparatus in accordance with claim 5 in which said light sensing means further comprises a photo-resistor and a screw-threaded, transparent light conducting element for conducting environmental illumination to said photo-resistor and in which said aperture adjusting means comprises a light obturating part threaded adjustably on to said light conducting element.

7. Apparatus in accordance with claim 6, in which said light conducting element comprises a screw bolt, and said light obturating part comprises a sleeve which can be screwed on said bolt and is in the form of an adjusting knob.

8. Apparatus in accordance with claim 7, in which said screw bolt comprises a fixing bolt for said photo-resistor.

9. Apparatus in accordance with claim 6 in which said light conducting element has a thickened end portion with a recess therein, said photo-resistor being received in said recess and in which a substance in which said photo-resistor is embedded is also received in said recess.

10. A vehicle exterior lighting system in accordance with claim 1 which includes a low beam filament, a side lamp and a tail lamp, all adapted to be switched on and off by said control device.

11. A control device in accordance with claim 1, in which said switching delay means comprises switching-off delay circuit means for producing a greater delay of the switching-off when the switching-off brightness value is exceeded, and separate switching-on delay circuit means for producing a shorter delay of the switching-on when said illumination is below the switching-on brightness value.

12. A control device in accordance with claim 11 in which said threshold value means comprises a Schmitt-trigger having an input transistor and output transistor in which said switching on delay circuit means comprises a capacitor connected between the base and the collector of said output transistor and also serving to suppress voltage fluctuations and peaks.

13. A control device in accordance with claim 12 in which a resistor is connected in series with the last-mentioned capacitor.

14. A control device in accordance with claim 1 in which said switching delay means is responsive to said sensing means, whereby the length of said delay by said switching delay menas depends upon said environmental illumination.

15. A control device in accordance with claim 1 in which said switching delay means includes at least one electrolytic capacitor the time constant of which causes the delay of at least one of said switching off and switching on of the exterior lighting system.

16. Apparatus in accordance with claim 1 in which said vehicle exterior lighting system has a main beam filament and a low beam filament and in which said control device is connected to said main beam filament in such a way that the control device switches off said low beam filament when said main beam filament is switched on.

17. A control device in accordance with claim 1, which further comprises a switching on delay means responsive to starting up of the vehicle for delaying the switching on of said exterior lighting system for a period of time normally sufficient for the starting of the engine of the vehicle.

18. A control device in accordance with claim 17, in which said switching on delay means comprises a thermal relay.

19. Apparatus in accordance with claim 1, in combination with a vehicle, in which said vehicle is fitted with a generator and in which said control device is connected to an output terminal of said vehicle generator.

20. Apparatus in accordance with claim 1, in combination with a vehicle in which said vehicle is fitted with a parking lamp and in which a change-over switch is provided for transferring said control device from said exterior lighting system to said parking lamp.

21. Apparatus in accordance with claim 1 in which said light sensing means comprises a light sensor and light conducting means for conducting said environmental illumination to said sensor.

22. A control device in accordance with claim 1 which further comprises threshold value displacement means containing a moisture probe for increasing illumination values at which switching on and off of said exterior lighting system responsive to precipitation.

23. A control device in accordance with claim 1, in combination with a windshield wiper motor and wiper motor switch, wherein said control device further includes threshold value displacement means responsive to the switching on of said motor by said motor switch, said threshold value displacement means being connected to said threshold value means for causing an increase in the illumination values at which said switching on and off of the exterior lighting system of the vehicle take place.

24. The combination in accordance with claim 23 in which said threshold value displacement means includes time delay means whose delay period starts with the switching on of said windshield wiper motor for delaying said threshold value displacement means from becoming effective for a predetermined time thereafter.

25. The combination in accordance with claim 24, in which said time delay means comprises a thermal relay having a heating resistor connected to said wiper motor to be switched on therewith.

26. The combination in accordance with claim 24, in which said time delay means comprises at least one temperature-variable resistance element and means connecting the latter whereby it is heated as a function of the switching on of the windshield wiper motor.

27. The combination in accordance with claim 26, in which said time delay means comprises a transistor switching element connected to said temperature-variable resistance element.

28. The combination in accordance with claim 24, in which said time delay means comprises a capacitor and a resistor in series therewith.

29. The combination in accordance with claim 23 in which said threshold value means includes a voltage divider and in which said threshold value displacement means is connected to said voltage divider for displacing the voltage divider ratio when said windshield wiper motor is switched on.

30. The combination in accordance with claim 23 in which said threshold value displacement means includes means rendering it non-responsive to brief switching on and off of said windshield wiper motor.

31. The combination in accordance with claim 23, in which said wiper motor has a first terminal connected to one pole of said d.c. network and a second terminal connected to said threshold value displacement means and said wiper motor switch, said motor switch being connected between the second terminal of said wiper motor and the other pole of said d.c. network, whereby said threshold value displacement means receives one polarity when said wiper motor is switched off and receives the other polarity when said wiper motor is switched on.

32. Apparatus in accordance with claim 1 in which said light sensing means comprises two light sensors connected in series and each comprising a photoresistor, said light sensors being arranged on said vehicle at two points located at a distance from one another in longitudinal direction of said vehicle.

33. A control device in accordance with claim 1, in which means for bridging the switching-on delay of said switching delay means are provided which are effective on operating a switch for headlamp flashing of the vehicle.

34. Apparatus in accordance with claim 1 further including a manually operated switch with one side connected to one pole of said d.c. network and wherein said control device further includes threshold value displacement means connected to the other side of said manually operated switch and to said threshold value means for causing an increase in the illumination values at which said switching on and off of the exterior lighting system of the vehicle takes place when said manually operated switch is closed.

35. Apparatus powered by a d.c. network for the switching on and off of a vehicle exterior lighting system as a function of environmental illumination, comprising light sensing means for sensing said illumination, an automatic control device and a windshield wiper motor, said control device including:
  threshold value means for switching states in response to said light sensing means, said threshold value means having a switching hysteresis such that it effects a switching off at a greater illumination than that at which the switching-on occurs;
  threshold value displacement means responsive to the switching on of said wiper motor and connected to said threshold value means for causing an increase in the illumination values at which the switching of said threshold value means takes place;
  means for switching said exterior lighting system on and off in response to said threshold value means; and
  switching delay means for delaying the switching off and the switching on at illumination values above and below the switching-on and switching-off illumination values, respectively.

36. Apparatus powered by a d.c. network for the switching on and off of a vehicle exterior lighting system as a function of environmental illumination, comprising light sensing means for sensing said illumination, an automatic control device and a manually operated switch with one side connected to one pole of said d.c. network and the other side connected to said control device, said control device including:
- threshold value means for switching states in response to said light sensing means, said threshold value means having a switching hysteresis such that it effects a switching off at a greater illumination than that at which the switching-on occurs;
- threshold value displacement means connected to the other side of said manually operated switch and to said threshold value means for causing an increase in the illumination values at which the switching of said threshold value means takes place when said manually operated switch is closed;
- means for switching said exterior lighting system on and off in response to said threshold value means; and
- switching delay means for delaying the switching off and the switching on at illumination values above and below the switching-on and switching-off illumination values, respectively.

* * * * *